(12) United States Patent
Yu et al.

(10) Patent No.: US 11,178,232 B2
(45) Date of Patent: Nov. 16, 2021

(54) METHOD AND APPARATUS FOR SHARING FUNCTION OF EXTERNAL DEVICE THROUGH COMPLEX NETWORK

(71) Applicant: Samsung Electronics Co., Ltd., Gyeonggi-do (KR)

(72) Inventors: Seung-dong Yu, Gyeonggi-do (KR); Woo-yong Chang, Gyeonggi-do (KR); Se-jun Park, Gyeonggi-do (KR); Min-jeong Moon, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/161,917

(22) Filed: Oct. 16, 2018

(65) Prior Publication Data
US 2019/0052715 A1 Feb. 14, 2019

Related U.S. Application Data

(63) Continuation of application No. 12/861,587, filed on Aug. 23, 2010, now abandoned.

(30) Foreign Application Priority Data

Aug. 21, 2009 (KR) .................. 10-2009-0077874

(51) Int. Cl.
*H04L 29/08* (2006.01)
*H04W 88/06* (2009.01)
*H04W 88/04* (2009.01)

(52) U.S. Cl.
CPC .......... *H04L 67/16* (2013.01); *H04L 67/2814* (2013.01); *H04W 88/06* (2013.01); *H04L 67/04* (2013.01); *H04W 88/04* (2013.01)

(58) Field of Classification Search
None
See application file for complete search history.

(56) References Cited

U.S. PATENT DOCUMENTS 6,601,093 B1 * 7/2003 Peters ............... H04L 29/12113
709/220
7,324,815 B2 1/2008 Ross et al.
(Continued)

FOREIGN PATENT DOCUMENTS

CN 1848946 10/2006
CN 101175111 5/2008
(Continued)

OTHER PUBLICATIONS

Delphinanto et al., "Proxying UPnP Service Discovery and Access to a Non-IP Bluetooth Network on a Mobile Phone", 2007 14th IEEE Symposium on Communications and Vehicular Technology in the Benelux, Nov. 15, 2007, 5 pages.
(Continued)

*Primary Examiner* — Dhairya A Patel
(74) *Attorney, Agent, or Firm* — The Farrell Law Firm, P.C.

(57) ABSTRACT

A method of sharing a function of a device, the method including detecting at least one device from among a plurality of devices through a first device connected to the plurality of devices through a plurality of networks, wherein the detecting is performed by a second device in the plurality of devices; interworking the second device with a third device in the detected at least one device, through the first device; and using, by the second device, a function of the third device through the first device.

19 Claims, 9 Drawing Sheets

(56) References Cited

U.S. PATENT DOCUMENTS

| | | | |
|---|---|---|---|
| 7,577,559 B2 | 8/2009 | Lesser et al. | |
| 7,908,379 B2* | 3/2011 | Droz | H04L 61/157 709/227 |
| 8,036,188 B2* | 10/2011 | Kwon | H04W 92/02 370/338 |
| 8,069,254 B2* | 11/2011 | Hlasny | H04L 29/06 709/229 |
| 8,090,616 B2* | 1/2012 | Proctor, Jr. | G06Q 20/202 705/21 |
| 8,094,597 B1* | 1/2012 | Chhabra | H04W 8/005 370/311 |
| 8,620,989 B2* | 12/2013 | Eisner | H04L 69/329 709/201 |
| 11,122,074 B2* | 9/2021 | Stolarz | H04L 63/1425 |
| 2003/0095524 A1* | 5/2003 | Stephens | H04L 29/08846 370/338 |
| 2003/0208691 A1* | 11/2003 | Smart | G06F 21/608 713/168 |
| 2004/0040023 A1* | 2/2004 | Ellis | G06F 8/60 717/178 |
| 2004/0077313 A1* | 4/2004 | Oba | H04B 5/0056 455/41.2 |
| 2005/0197061 A1* | 9/2005 | Hundal | H04M 1/72412 455/41.2 |
| 2005/0235336 A1* | 10/2005 | Ma | H04N 5/765 725/134 |
| 2006/0129679 A1* | 6/2006 | Hlasny | H04L 47/50 709/227 |
| 2006/0227864 A1* | 10/2006 | Miyamoto | H04L 12/2836 375/240.01 |
| 2006/0242322 A1* | 10/2006 | Williams | H04L 63/029 709/245 |
| 2006/0288071 A1* | 12/2006 | Bigioi | H04L 12/2803 709/203 |
| 2007/0030824 A1* | 2/2007 | Ribaudo | H04L 51/38 370/328 |
| 2007/0263514 A1 | 11/2007 | Iwata et al. | |
| 2008/0014947 A1* | 1/2008 | Carnall | G08B 21/22 455/437 |
| 2008/0043834 A1 | 2/2008 | Lesser et al. | |
| 2008/0232810 A1* | 9/2008 | Lu | G08C 17/02 398/112 |
| 2008/0248740 A1* | 10/2008 | Lazovsky | G06Q 30/06 455/3.01 |
| 2008/0250096 A1* | 10/2008 | Koide | H04N 21/8153 709/201 |
| 2008/0287100 A1* | 11/2008 | Satheesh | H04W 8/18 455/411 |
| 2009/0006972 A1* | 1/2009 | Karlson | H04L 67/06 715/737 |
| 2009/0022091 A1* | 1/2009 | Buer | H04L 12/5691 370/328 |
| 2009/0047948 A1* | 2/2009 | Turetsky | H04W 48/20 455/432.1 |
| 2009/0100151 A1 | 4/2009 | Fisher et al. | |
| 2009/0122149 A1* | 5/2009 | Ishii | H04N 1/00973 348/222.1 |
| 2009/0325642 A1* | 12/2009 | Schuler | G06F 3/1454 455/566 |
| 2011/0302501 A1* | 12/2011 | Taguchi | H04N 21/43632 715/740 |

FOREIGN PATENT DOCUMENTS

| | | | |
|---|---|---|---|
| EP | 1587305 A2 * | 10/2005 | H04N 5/765 |
| EP | 1 865 687 | 12/2007 | |
| JP | 2001-060907 | 3/2001 | |
| JP | 2006-129468 | 5/2006 | |
| JP | 2006-295586 | 10/2006 | |
| JP | 2006-311267 | 11/2006 | |
| JP | 2006-339855 | 12/2006 | |
| JP | 2007-148828 | 6/2007 | |
| JP | 2007-336369 | 12/2007 | |
| KR | 1020040064587 | 7/2004 | |
| KR | 1020070071159 | 7/2007 | |
| KR | 1020080090790 | 10/2008 | |
| KR | 1020090037061 | 4/2009 | |
| RU | 2 321 968 | 4/2008 | |
| TW | 200941255 | 10/2009 | |
| WO | WO 02/056633 | 7/2002 | |
| WO | WO 2006/025322 | 3/2006 | |
| WO | WO 2009/151452 | 12/2009 | |

OTHER PUBLICATIONS

Australian Examination Report dated May 6, 2013 issued in Application No. 2010284794, 3 pages.
Canadian Office Action dated Nov. 19, 2013 issued in counterpart application No. 2,769,179, 3 pages.
Australian Examination Report dated Jan. 23, 2014 issued in counterpart application No. 2010284794, 4 pages.
Chinese Office Action dated Feb. 28, 2014 issued in counterpart application No. 201080037006.6, 16 pages.
Australian Examination Report dated Jul. 15, 2014 issued in counterpart application No. 2010284794, 7 pages.
Japanese Office Action dated Jul. 29, 2014 issued in counterpart application No. 2010-186288, 8 pages.
Korean Office Action dated Jul. 25, 2014 issued in counterpart application No. 10-2009-0077874, 8 pages.
Taiwanese Search Report dated Jan. 21, 2015 issued in counterpart application No. 99128111, 13 pages.
Japanese Office Action dated Jun. 22, 2015 issued in counterpart application No. 2010-186288, 7 pages.
Chinese Office Action dated Aug. 3, 2015 issued in counterpart application No. 201080037006.6, 21 pages.
Indonesian Office Action dated Jun. 17, 2015 issued in counterpart application No. W00201201053, 6 pages.
Taiwanese Office Action dated Feb. 25, 2016 issued in counterpart application No. 104119674, 8 pages.
Japanese Office Action dated Mar. 7, 2016 issued in counterpart application No. 2010-186288, 5 pages.
Australian Examination Report dated Apr. 15, 2016 issued in counterpart application No. 2015201793, 6 pages.
Japanese Office Action dated Oct. 24, 2016 issued in counterpart application No. 2015-207791, 7 pages.
Japanese Decision on Rejection dated Jun. 26, 2017 issued in counterpart application No. 2015-207791, 4 pages.
Brazilian Office Action dated Feb. 19, 2020 issued in counterpart application No. 1120120034340, 8 pages.

* cited by examiner

METHOD AND APPARATUS FOR SHARING FUNCTION OF EXTERNAL DEVICE THROUGH COMPLEX NETWORK

PRIORITY

This application is a Continuation of U.S. patent application Ser. No. 12/861,587, filed on Aug. 23, 2010 with the U.S. Patent and Trademark Office and claims priority to Korean Patent Application No. 10-2009-0077874, filed on Aug. 21, 2009, in the Korean Intellectual Property Office, the disclosure of each of which are incorporated herein in its entirety by reference.

BACKGROUND OF THE INVENTION

1. Field of the Invention

The present invention relates to communication between devices through a complex network.

2. Description of the Related Art

Recent electronic devices have been provided with a communication function through a network. Some electronic devices communicate through various networks, whereas some devices communicate only through a limited network. Although the performance of the electronic devices using various networks is improving, communication through a heterogeneous network is still inconvenient.

Although electronic devices are widely becoming portable due to miniaturization of the electronic devices and development of a network, it is practically difficult to install all functions in portable electronic devices, and thus only representative functions suitable for the purpose of the portable electronic devices are generally installed.

SUMMARY OF THE INVENTION

The present invention provides function sharing between devices through a network.

According to an aspect of the present invention, there is provided a method comprising establishing, at a second device, a connection to a first device through a first network; detecting, at the second device, at least one device connected to the first device through a second network which is different from the first network; selecting, at the second device, a third device from among the at least one device; selecting, at the second device, a function of the third device; and transmitting, at the second device, a request to the third device through the first device, wherein the request requests that the third device perform the selected function of the third device.

The method further includes a method comprising establishing, at a third device, a connection with a first device through a second network, wherein the third device is detected at a second device connected to the first device through a first network which is different from the second network; receiving, at the third device, a request from the second device through the first device, wherein the request requests that the third device perform a function of the third device; and performing, at the third device, the function of the third device in response to the request from the second device.

The method further includes a method comprising establishing, at a first device, a connection with a second device through a first network and a connection with at least one device through a second network which is different from the first network; transmitting, at the first device, information about performable functions of the at least one device to the second device; and relaying, at the first device, a request from the second device to a third device which is selected from among the at least one device by the second device, wherein the request requests that the third device perform a function of the third device.

The method further includes a second device comprising at least one processor configured to execute instructions to establish, at the second device, a connection to a first device through a first network; detect, at the second device, at least one device connected to the first device through a second network which is different from the first network; obtain, at the second device, information about performable functions of the at least one device from the first device; select, at the second device, a third device from among the at least one device; select, at the second device, a function of the third device; and transmit, at the second device, a request to the third device through the first device, wherein the request requests that the third device perform the function of the third device.

The method further includes a third device comprising at least one processor configured to execute instructions to establish, at the third device, a connection with a first device through a second network, wherein the third device is detected at a second device connected to the first device through a first network which is different from the second network; receive, at the third device, a request from the second device through the first device, wherein the request requests that the third device perform a function of the third device; and perform, at the third device, the function of the third device in response to the request from the second device.

The method further includes a first device comprising at least one processor configured to execute instructions to establish, at the first device, a connection with a second device through a first network and a connection with at least one device through a second network which is different from the first network; transmit, at the first device, information about performable functions of the at least one device to the second device; and relay, at the first device, a request from the second device to a third device which is selected from among the at least one device by the second device, wherein the request requests that the third device perform a function of the third device.

According to another aspect of the present invention, there is provided a non-transitory computer-readable medium having recorded thereon a program for executing any of the above methods.

BRIEF DESCRIPTION OF THE DRAWINGS

The above and other features and advantages of the present invention will become more apparent by describing in detail embodiments thereof with reference to the attached drawings in which.

DETAILED DESCRIPTION OF THE INVENTION

Hereinafter, the present invention will be described more fully with reference to the accompanying drawings, in which embodiments of the invention are shown.

A structure of a device for requesting an external device to share a function, a structure of a device for performing a shared function between devices, and a structure of a relay device for performing a relay function by being connected to a plurality of devices in a plurality of networks will now be described with reference to FIGS. 1, 2, and 3, respectively.

Herein, 'a relay device for performing a relay function by being connected to a plurality of devices in a plurality of networks' may be referred to as a first device, 'a device for requesting an external device to share a function' may be referred to as a second device, and 'a device for performing a shared function between devices' may be referred to as a third device.

The plurality of networks includes both a local area network and a long-distance network, and in detail, may include a wireless protocol complying with a Bluetooth® method, a wireless communication method complying with a wireless fidelity (Wi-Fi) method, and a wireless broadband Internet method complying with a wireless broadband (Wi-Bro) method.

Figure 1:
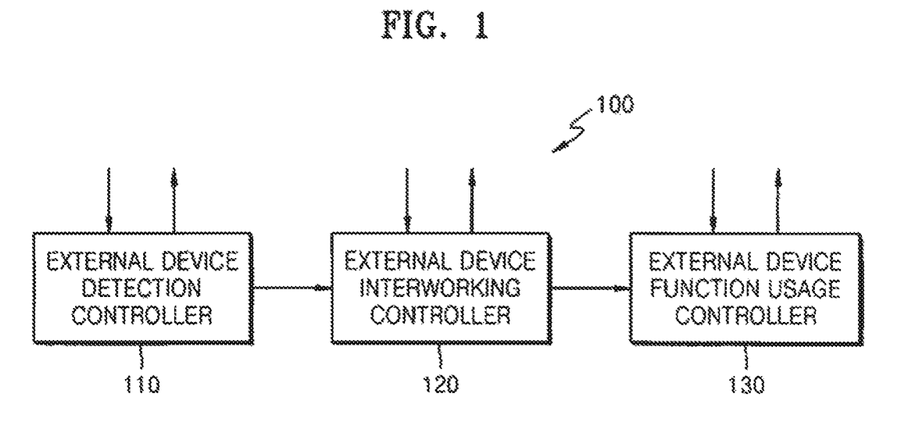
FIG. 1 is a block diagram of a device for requesting an external device to share a function, from among devices capable of sharing a function of the external device through a plurality of networks, according to an embodiment of the present invention.

FIG. 1 is a block diagram of a device 100 for requesting an external device to share a function, from among devices capable of sharing a function of the external device through a plurality of networks, according to an embodiment of the present invention.

The device 100 according to the present invention will be referred to as "second device 100", and includes an external device detection controller 110, an external device interworking controller 120, and an external device function usage controller 130. The device 100 corresponds to the second device from among the first through third devices that are named by classifying the devices capable of sharing a function of an external device through the plurality of networks according to functions.

The external device detection controller 110 detects at least one device from among a plurality of devices in all networks connected to the first device, through the first device connected to the devices including the second device 100 through the plurality of networks.

When the second device 100 is connected to the first device through a first network, the external device detection controller 110 may detect another device connected to the first device through a network other than the first network. In other words, the other device in a heterogeneous network may be detected through the first device.

The second device 100 may detect all devices capable of communication through networks of the first device.

Alternatively, the second device 100 may detect at least one device that is capable of performing a function required by the second device 100, from among the devices connected to the first device. The second device 100 may search for the at least one device capable of performing a function required by the second device 100 from among the devices connected to the first device, and select the third device to be interworked with the second device 100 from among a found at least one device.

Alternatively, when the second device 100 requires a predetermined function, the first device may search for at least one device capable of performing the predetermined function from among the devices in the networks. Here, the external device detection controller 110 of the second device 100 may select and detect the third device from among the at least one device found by the first device.

The first device may arbitrarily recommend at least one device to the second device 100. Here, the external device detection controller 110 may selectively detect the third device to be interworked from among the recommended at least one device.

In order to determine a function of the third device, the second device 100 may obtain information about performable functions of the devices from the first device. Alternatively, the second device 100 may directly request the third device for information about performable functions, and determine whether to use the function of the third device according to a response of the third device.

The external device interworking controller 120 controls interworking with the third device from among the at least one device detected by the second device 100 through the first device.

The external device function usage controller 130 controls the second device 100 to use the function of the third device through the first device.

By interworking with the third device through the first device, the function of the third device may be performed by the third device, wherein the function is unable to be directly performed by the second device 100. Here, the third device performs the shared function, but the second device 100 may obtain result data. Various types of data, such as the result data generated by performing the shared function, may be transferred between the second device 100 and the third device through the first device operating as a relay.

The second device 100 may change a structure of a user interface so as to execute the function of the third device. The second device 100 displays a select menu for a user input on a display unit (not shown). A new select menu for selecting the function of the third device, which is shared with the second device 100, may be further displayed on the display unit, other than a select menu for an existing function, from among the select menu.

Figure 2:
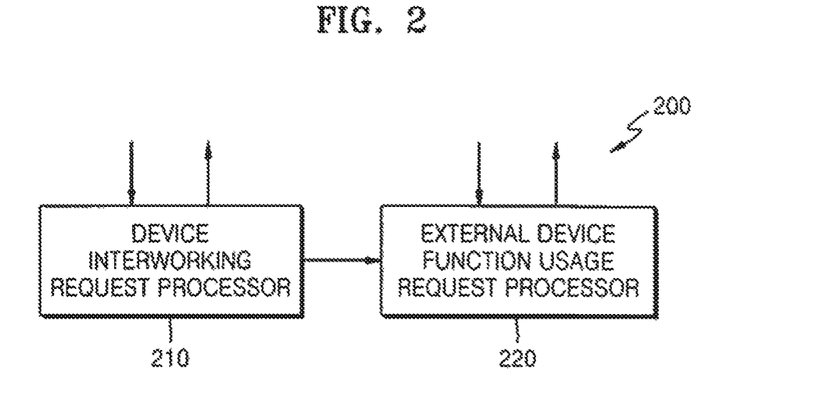
FIG. 2 is a block diagram of a device for performing a shared function between devices, from among devices capable of sharing a function of an external device through a plurality of networks, according to an embodiment of the present invention.

FIG. 2 is a block diagram of a device 200 for performing a shared function between devices, from among devices capable of sharing a function of an external device through a plurality of networks, according to an embodiment of the present invention.

The device 200 according to the current embodiment of the present invention will be referred to as "third device 200", and includes a device interworking request processor 210 and an external device function usage request processor 220. The device 200 corresponds to the third device from among the first through third devices that are named by classifying the devices capable of sharing a function of an external device through the plurality of networks according to functions.

The device interworking request processor 210 receives an interworking request from the second device 100 connected to the first device through the plurality of networks. The second device 100 detects the plurality of devices connected to the first device through the plurality of networks, and requests to interwork with the third device 200. The device interworking request processor 210 processes the interwork request of the second device 100.

The third device 200 may be directly selected and requested to be interworked by the second device. Alternatively, the second device 100 or the first device may search for the third device 200 to be interworked by referring to performable functions of the third device 200.

Information about the performable functions of the third device 200 may be pre-provided to the first or second device by the third device. Alternatively, the information about the performable functions of the third device 200 may be provided to the first or second device according to a request of the first or second device.

The external device function usage request processor 220 may control the third device 200 to perform a predetermined function according to a usage request of the predetermined function of the third device 200 received from the second device 100 through the first device.

The predetermined function corresponding to the usage request may be a function that is unable to be directly performed by the second device 100, but is performable by the third device 200. Here, the third device 200 performs the predetermined function shared with the second device 100, but the external device function usage request processor 220 may provide generated various types of data, such as result data, to the second device 100 through the first device operating as a relay.

The result data obtained by performing the predetermined function of the third device 200 may be formatted to a data format executable by the second device 100, and then transmitted to the second device 100. When the result data of the third device 200 has a data format that is unable to be executed by the second device 100, the third device 200 may format the result data to be executable by the second device 100 and output the result data to the first device.

Information about a function performance status of the third device 200 may be provided to the first device. The second device 100 may display a notification window or a warning window about a current performance status on a user interface, by using the information about the function performance status of the third device 200.

The second and third devices 100 and 200 of FIGS. 1 and 2 are described as separate devices, but the devices connected to the first device may perform functions of both the second device 100 and the third device 200. Accordingly, a device including all elements of the second device 100 and the third device 200 may exist as the device connected to the first device.

Figure 3:
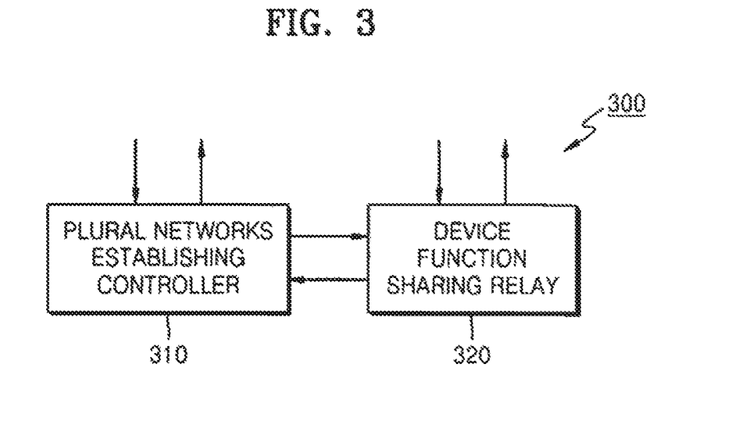
FIG. 3 is a block diagram of a relay device from among devices capable of sharing a function of an external device through a plurality of networks, according to an embodiment of the present invention.

FIG. 3 is a block diagram of a relay device 300 from among devices capable of sharing a function of an external device through a plurality of networks, according to an embodiment of the present invention.

The relay device 300 includes a plural networks establishing controller 310 and a device function sharing relay 320. The relay device 300 corresponds to the first device from among the first through third devices that are named by classifying the devices capable of sharing a function of an external device through the plurality of networks according to functions.

The plural networks establishing controller 310 establishes a plurality of networks of the first device 300 connected to the plurality of devices, by connecting the first device 300 to at least one device for each network.

The device function sharing relay 320 relays function sharing between the second device 100 and the third device 200 connected to the first device 300 through individual network. The second device 100 detects at least one device in the networks established by the plural networks establishing controller 310 through the first device 300. The device function sharing relay 320 may relay interworking between the second device 100 and the third device 200 from among the at least one device detected by the second device 100.

Also, the device function sharing relay 320 relays a function of the third device 200 so that the second device 100 uses the function of the third device 200. For example, the device function sharing relay 320 may connect the first device 300 and the second device 100 through the first network, and the first device 300 and the third device 200 through a second network, for data exchange between the second device 100 and the third device 200.

Alternatively, when the second device 100 requests to interwork and share a function with devices in an external network, the first device 300 may connect all devices connected to the first device 300 to the second device 100 through the other network, or connect a device having a certain function requested by the second device 100 to the second device 100.

Also, when result data obtained by performing the function of the third device 200 has a data format that cannot be recognized by the second device 100, the first device 300 may change the data format to be recognizable by the second device 100.

In the first device 300, the second device 100, and the third device 200 from among the plurality of devices in the plurality of networks, according to the embodiments of the present invention, the second device 100 and the third device 200 may share a function while centering around the first device 300.

Specifically, when the second device 100 and the third device 200 are connected to the first device 300 through heterogeneous networks, a direct networking between the second device 100 and the third device 200 is not possible. Accordingly, the function sharing between the second device 100 and the third device 200 through the first device 300 is very useful.

Accordingly, interworking between devices that could not be mutually connected due to different networking methods is possible by mutually connectable devices extended through a complex network, and thus a number of devices used by a user through the interworking increases. Also, a current device may use a predetermined function of a device in a heterogeneous network through a relay device, wherein the predetermined function is not performable by the current device but performable by the device in the heterogeneous network by connecting to the device through the relay device.

Figure 4:
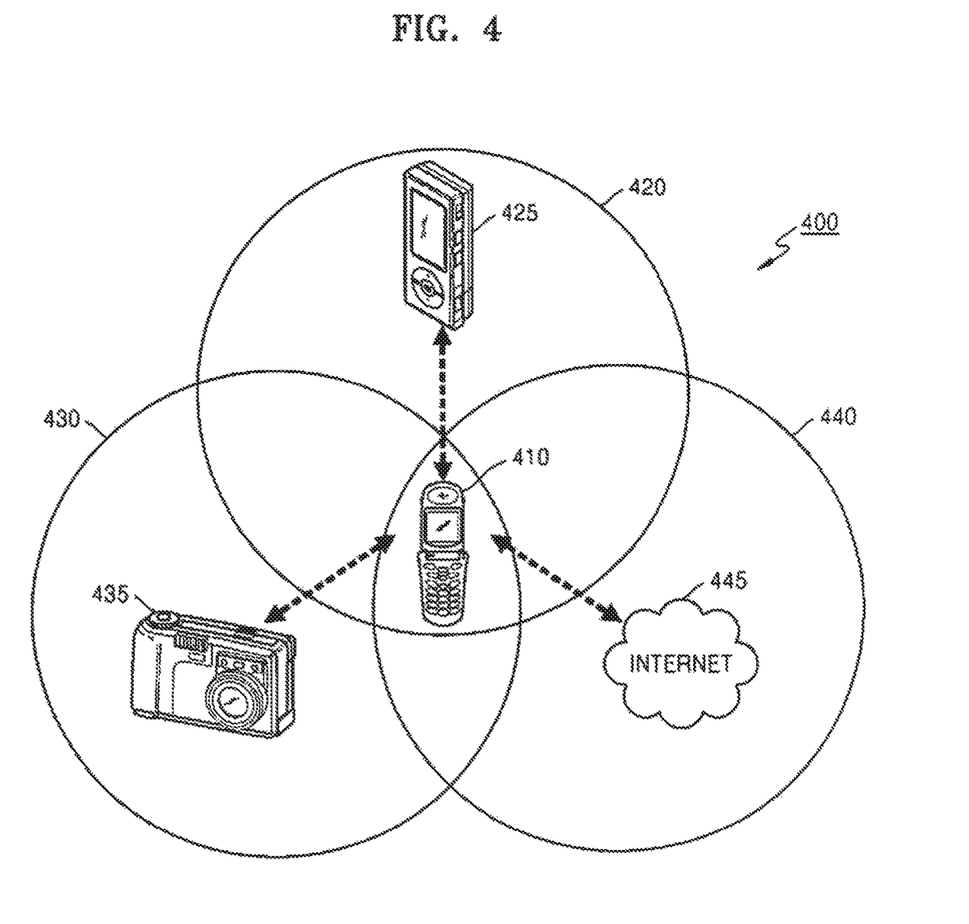
FIG. 4 is a diagram of a plurality of networks established between a plurality of devices centering around a relay device, according to an embodiment of the present invention.

FIG. 4 is a diagram of a plurality of networks established between a plurality of devices centering around a relay device, according to an embodiment of the present invention.

A mobile phone 410 is connected to a mobile MP3 player 425 through a first network 420, to a digital camera 435 through a second network 430, and to an Internet 445 through a third network 440. The mobile MP3 player 425 and the digital camera 435 are devices capable of wireless communication, the first and second networks 420 and 430 comply with a local area network method, and the third network 440 complies with a long-distance network method.

It is not possible to directly connect the mobile MP3 player 425 and the digital camera 435 capable of wireless communication according to the local area network method to the Internet 445 according to the long-distance network method. Also, the mobile MP3 player 425 and the digital camera 435 may each wirelessly communicate with the mobile phone 410 according to the local area network method, but if the first and second networks 420 and 430 comply with a heterogeneous network method, it is not possible to directly connect the mobile MP3 player 425 and the digital camera 435.

Accordingly, when the concept of the second device 100, the third device 200, and the first device 300 are applied to a complex network 400 of FIG. 4, the mobile phone 410 may operate as the first device 300, and the mobile MP3 player 425 and the digital camera 435 may each operate as the second device 100 or the third device 200.

Since the complex network 400 of FIG. 4 is only one embodiment of the present invention, the mobile phone 410 may not operate as the third device 300, which functions as a relay for other devices to share a function. If the mobile phone 410 is connected to another relay device through another network, the mobile phone 410 may share a function with an external device through the other relay device.

Figure 5A:
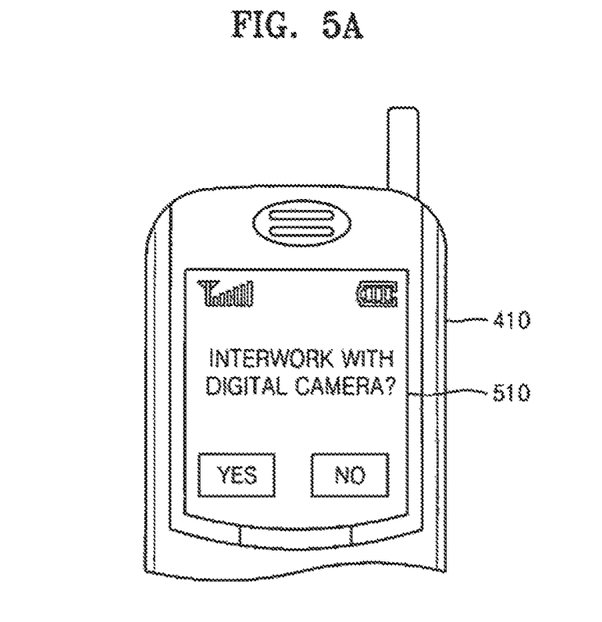
FIGS. 5A and 5B are diagrams for describing operations of a relay device, according to an embodiment of the present invention.
Figure 5B:
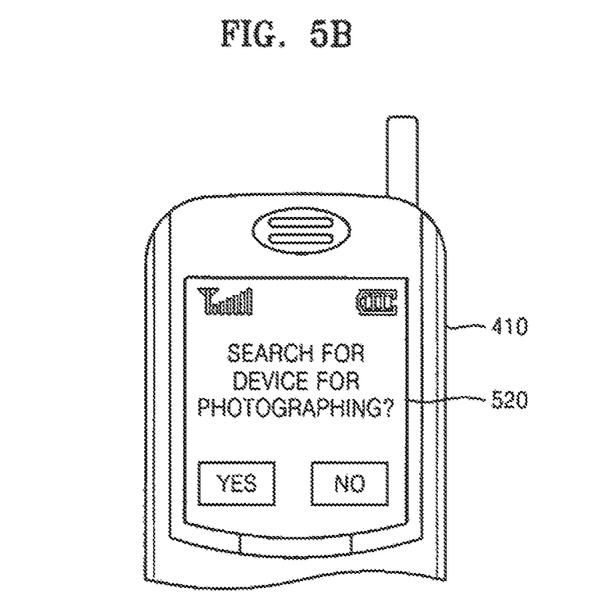

FIGS. 5A and 5B are diagrams for describing operations of the mobile phone 410, i.e., a relay device, according to an embodiment of the present invention.

When the mobile phone 410 operates as the second device 100, and the mobile MP3 player 425 detects the digital camera 435 in an external network through the mobile phone 410, the mobile MP3 player 425 and the digital camera 435 may interwork through the mobile phone 410.

The mobile MP3 player 425 may be interworked with all detected devices all the time, but throughput and network traffic may be high, and thus the mobile phone 410 may relay interworking with the digital camera 435 at a point of time when the mobile MP3 player 425 requires the interworking.

Also, a user may control an operation of the mobile MP3 player 425 detecting devices in an external network through the mobile phone 410. Specifically, the mobile phone 410 may search for an external device capable of performing a function desired by the user, and notify the mobile MP3 player 425 to detect only the found external device.

The mobile phone 410 may provide a relay menu regarding function sharing between devices as a user interface, so that the user is able to directly control the function sharing between the devices.

A first relay menu 510 is a user description menu for relaying interworking with the digital camera 435 pre-detected by the mobile MP3 player 425. A second relay menu 520 allows the user to determine whether the mobile phone 410 should search for a device to perform a 'photographing function' from the complex network 400, if the mobile MP3 player 425 requires to interwork with a device to perform the 'photographing function'.

The first and second relay menus 510 and 520 of FIGS. 5A and 5B are only embodiments used for convenience of description, and the mobile phone 410 may provide various relay menus for a user interface.

FIGS. 6A through 6D are diagrams for describing an example of sharing a function according to an embodiment of the present invention.

Figure 6A:
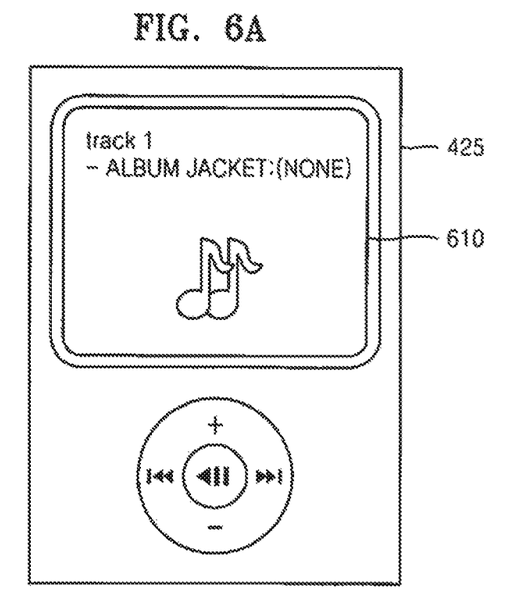
FIGS. 6A through 6D are diagrams for describing an example of sharing a function according to an embodiment of the present invention.

The mobile MP3 player 425 is a device capable of local area networking with the mobile phone 410, and may reproduce a sound file and render an image file. Specifically, when an image file corresponding to a sound file is stored in the mobile MP3 player 425, the mobile MP3 player 425 may reproduce the sound file while displaying the corresponding image file as a background image.

In a reproduction screen 610 of the mobile MP3 player 425 In FIG. 6A, 'track 1' music is being reproduced, but an image file of a corresponding album jacket is not stored in the mobile MP3 player 425, and thus the album jacket is not displayed. Also, a user interface of the mobile MP3 player 425 does not have a menu regarding searching for and downloading of the image file of the album jacket.

The mobile MP3 player 425 is connected to the mobile phone 410 through the first network 420, and the mobile phone 410 is connected to the Internet 445 through the third network 440.

The first network 420 is a local area network, and the third network 440 is a long-distance network. Accordingly, it is not possible to directly connect the mobile MP3 player 425 connected to the mobile phone 410 through the local area network, and the Internet 445 connected to the mobile phone 410 through the long-distance network.

However, the mobile MP3 player 425 may detect and mutually interwork with the Internet 445 through the mobile phone 410. Thus, the mobile MP3 player 425 may use a search and download services provided by an Internet service provider through the Internet 445.

Figure 6B:
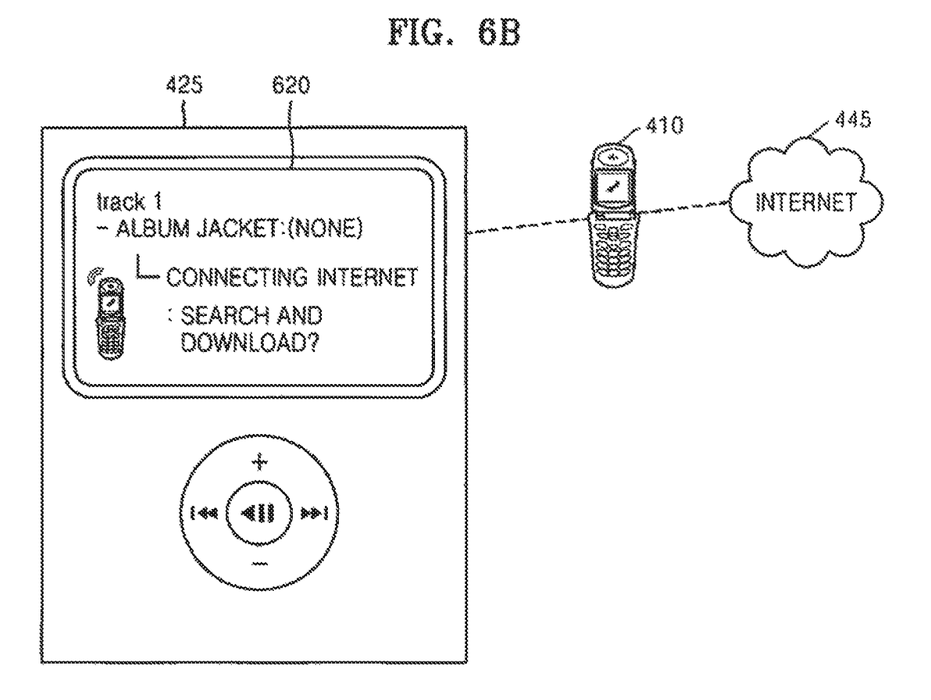

Also, the mobile MP3 player 425 may interwork with the Internet 445 and generate a new menu for selecting various functions by using the Internet 445, which is not included in an original user interface, and display the new menu as a user interface. For example, the mobile MP3 player 425 may newly add a menu 620 for using the searching and downloading services to the user interface, so that the user may select an image file searching and downloading function through the Internet 445.

Figure 6C:
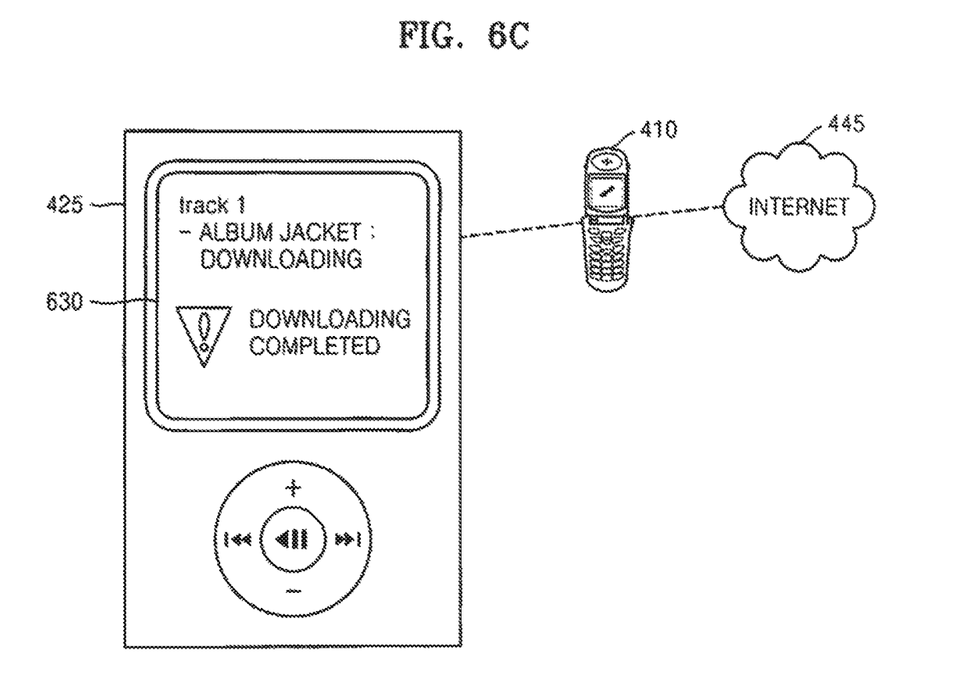

When the user selects the image file searching and downloading function through the Internet 445, the mobile MP3 player 425 may request the mobile phone 410 to perform the image file searching and downloading function through the Internet 445. When the image file is downloaded through the Internet 445, the downloaded image file is transmitted to the mobile MP3 player 425 through the mobile phone 410, and the mobile MP3 player 425 may display a notification window 630 on the user interface that function sharing with an external device is completed, as shown in FIG. 6C.

Figure 6D:
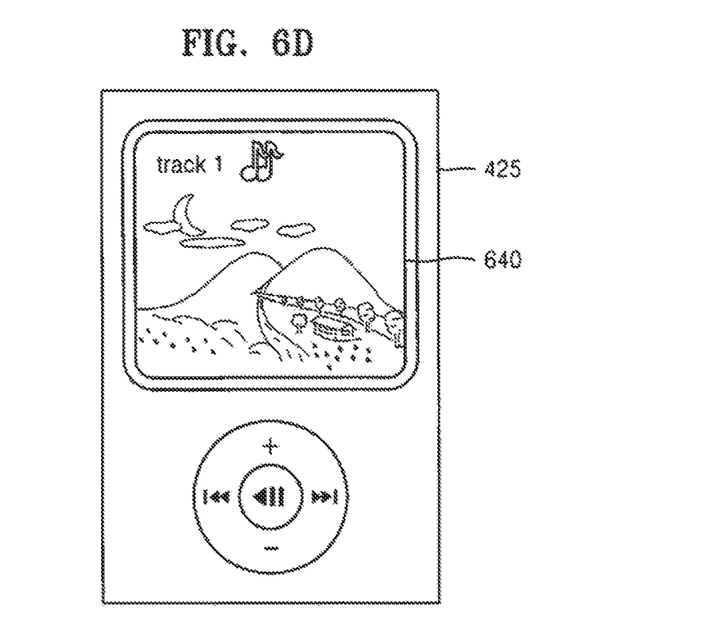

Accordingly, the mobile MP3 player 425 reproduces the 'track 1' music, while displaying an album jacket 640 downloaded and stored by using the Internet 445 as a background image, as shown in FIG. 6D.

FIGS. 7A through 7D are diagrams for describing another example of sharing a function according to an embodiment of the present invention.

Figure 7A:
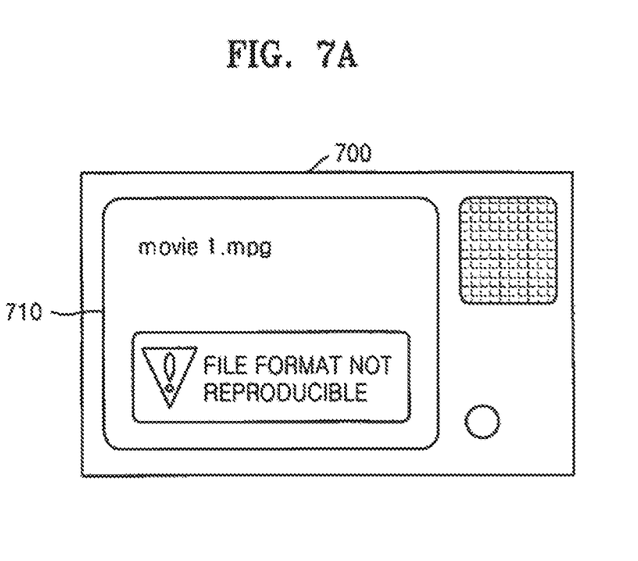
FIGS. 7A through 7D are diagrams for describing another example of sharing a function according to an embodiment of the present invention.

A Portable Multimedia Player (PMP) 700 is capable of local area networking with the mobile phone 410, and may reproduce a moving image file. However, the PMP 700 is unable to recognize a moving image file with the extension 'mpg'. Accordingly, when a command to reproduce the moving image file with the extension 'mpg' is received, the PMP 700 displays a warning window 710 notifying that the moving image file is unable to be reproduced, as shown in FIG. 7A.

Since the PMP 700 does not include a transcoding function of a moving file, the PMP 700 does not display a menu about a moving image transcoding on a user interface.

The PMP 700 is connected to the mobile phone 410 through a first local area network, and the mobile phone 410 is connected to a transcoding device 720 through a second local area network.

Since the first and second local area networks comply with different network methods, it is not possible to directly connect the PMP 700 connected to the mobile phone 410 through the first local area network, and the transcoding device 720 connected to the mobile phone 410 through the second local area network.

However, the PMP 700 may detect and mutually interwork with the transcoding device 720 through the mobile phone 410. Accordingly, the PMP 700 may share a transcoding function of the transcoding device 720.

Figure 7B:
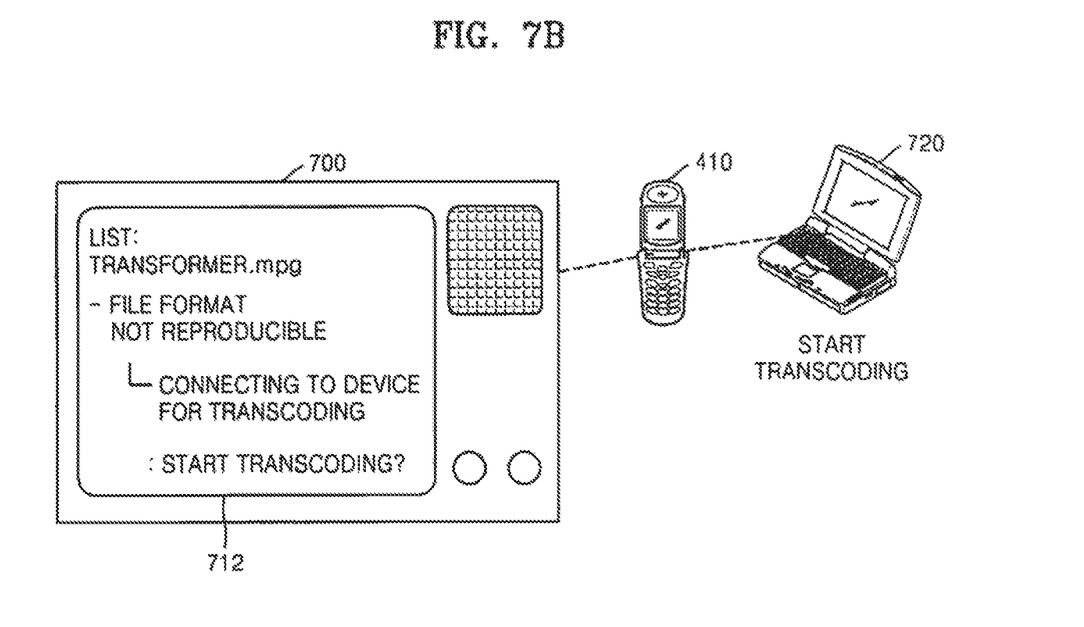

Also, the PMP 700 may interwork with the transcoding device 720 and generate a new menu for selecting functions of the transcoding device 720, which is not included in an original user interface, and display the new menu as a user interface.

For example, as shown in FIG. 7B, the PMP 700 may newly add a moving image transcoding menu 712 using the transcoding device 720 to the user interface, so that the user may select the moving image transcoding function using the transcoding device 720.

Figure 7C:
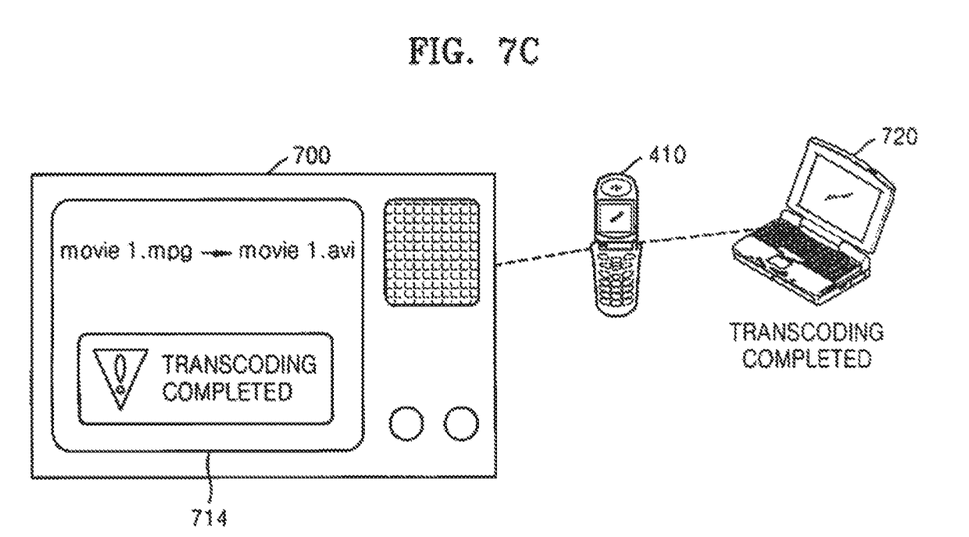

When the user selects the moving image transcoding function using the transcoding device 720, the PMP 700 may request the transcoding device 720 to perform the moving image transcoding function through the mobile phone 410. When the moving image transcoding function is completed by the transcoding device 720, the transcoded moving image file is transmitted to the PMP 700 through the mobile phone 410, and the MP 700 may display a notification window 714 on the user interface that function sharing with an external device is completed, as shown in FIG. 7C.

Figure 7D:
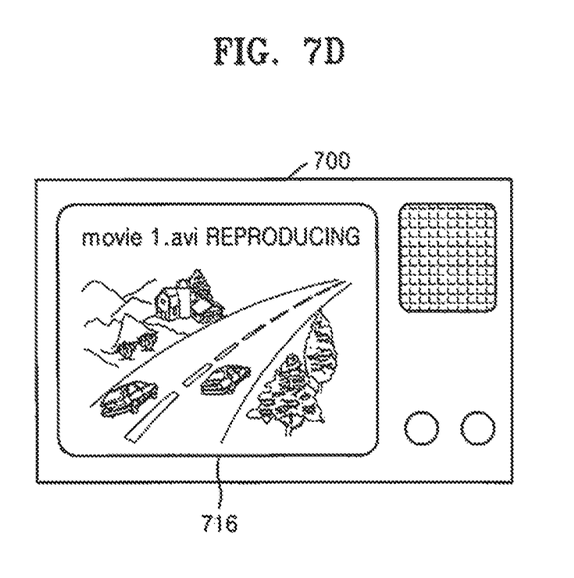

Accordingly, the PMP 700 may obtain and reproduce a moving image file of 'TRANSFORMER.avi' in a reproducible data format, as shown in FIG. 7D.

The embodiment of connecting the mobile MP3 player 425 and the internet 445 through the mobile phone 410 has been described with reference to FIGS. 6A through 6D, and the embodiment of connecting the PMP 700 and the transcoding device 720 through the mobile phone 410 has been described with reference to FIGS. 7A through 7D.

The above embodiments are only for understanding, and the first through third devices according to an embodiment of the present invention may be applied to various electronic devices. For example, a relay device exclusive to a complex network may be used as the first device, and when the PMP 700 operating as the second device is interworked with a digital camera operating as the third device through the first device, the PMP 700 may use a photographing function, a photograph editing function, or a moving image photographing function of the digital camera.

When the PMP 700 is interworked with the Internet through the first device, the PMP 700 may use a screen capturing function, a lyric searching function, or shopping function through the Internet. When the PMP 700 is interworked with a digital television (TV) or a Personal Video Recorder (PVR) through the first device, the PMP 700 may record a currently broadcasted program or reproduce an existing recorded broadcast of the digital TV or the PVR through the first device.

Alternatively, the PMP 700 may be connected to a mobile phone through the first device. Here, the PMP 700 may call the mobile phone or use a camera function installed in the mobile phone through the first device.

Figure 8:
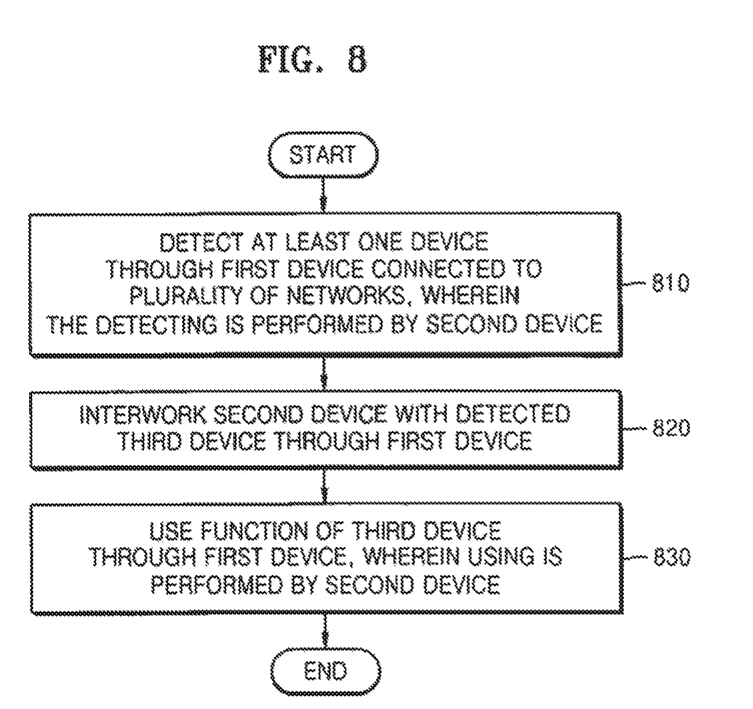
FIG. 8 is a flowchart illustrating a method of requesting an external device to share a function, in a method of sharing a function of a device through a plurality of networks, according to an embodiment of the present invention.

FIG. 8 is a flowchart illustrating a method of requesting an external device to share a function, in a method of sharing a function of a device through a plurality of networks, according to an embodiment of the present invention.

In step 810, a second device detects at least one device from among a plurality of devices through a first device connected to the plurality of devices through a plurality of networks.

The at least one device detected by the second device may be in a network different from a network through which the first device and the second device are connected. The second device may detect all devices connected to the first device, or may search for and selectively detect a device capable of performing a function desired by the second device.

In step 820, a third device from among the at least one device is interworked with the second device through the first device. Information exchange between the second device and the third device by interworking and connecting the second and third devices may be relayed by the first device.

In step 830, the second device uses a function of the third device through the first device. The second device requests the third device to perform the function that is unable to be performed by the second device but is able to be performed by the third device, and data generated by performing the function may be transmitted to the second device through the first device. The second device may newly generate a user interface menu for sharing a function with an external device.

Figure 9:
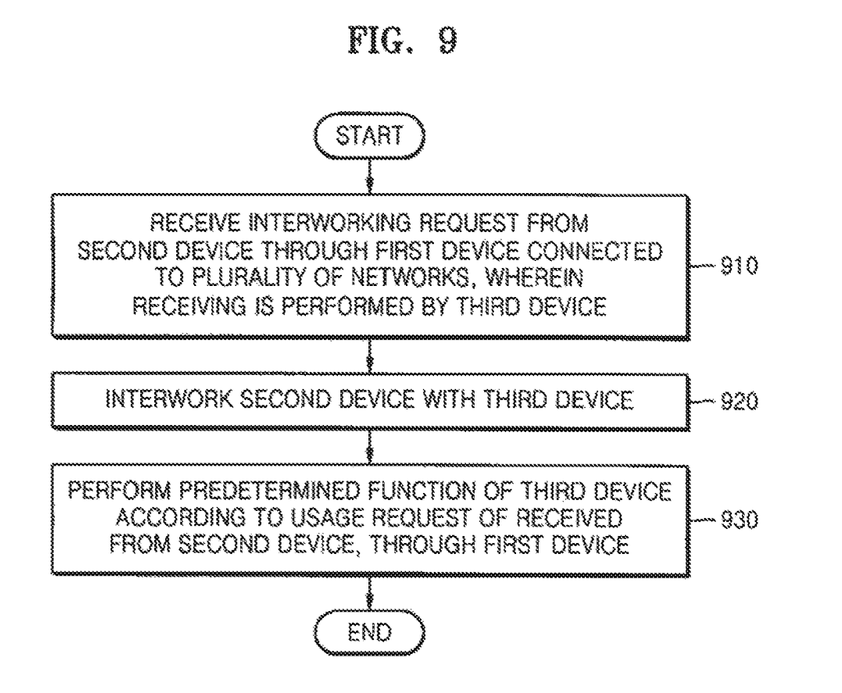
FIG. 9 is a flowchart illustrating a method of performing a shared function between devices, in the method of sharing a function of a device through a plurality of networks, according to an embodiment of the present invention.

FIG. 9 is a flowchart illustrating a method of performing a shared function between devices, in the method of sharing a function of a device through a plurality of networks, according to an embodiment of the present invention.

In step 910, a third device from among at least one device receives an interwork request from a second device that detected the at least one device through a first device connected to a plurality of devices through a plurality of networks.

The second device may request interworking to all connectable devices through the first device, but in a restricted environment, the second device may request to interwork only with a device capable of performing a function desired by the second device through the first device. The first or second device may request for information about performable functions of the third device.

In step 920, the second and third devices are interworked with each other through the first device.

In step 930, a predetermined function of the third device is performed according to a usage request received from the second device, through the first device. Information about a function performance status of the third device may be provided to the first device.

Figure 10:
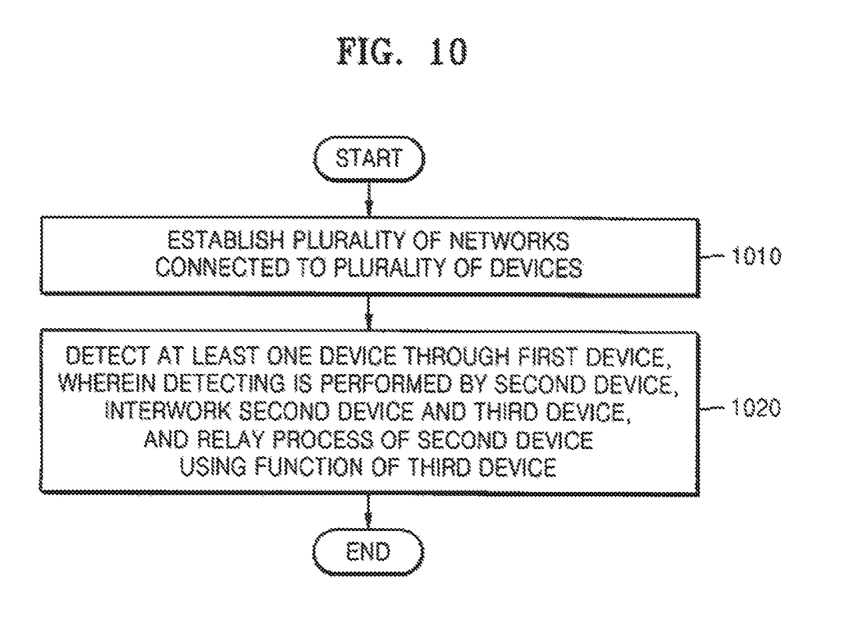
FIG. 10 is a flowchart illustrating a relay method in the method of sharing a function of a device through a plurality of networks, according to an embodiment of the present invention.

FIG. 10 is a flowchart illustrating a relay method in the method of sharing a function of a device through a plurality of networks, according to an embodiment of the present invention.

In step 1010, a plurality of networks of a first device connected to a plurality of devices are established as the first device is connected to at least one device for each network.

In step 1020, a second device in the plurality of devices detects at least one device from among the plurality of devices, the second device and a third device in the at least one device are interworked with each other, and a function sharing process of the second device using a function of the third device is relayed.

According to the present invention, interworking between devices that could not be mutually connected to each other through a complex network is possible, and thus types of devices that are interworked and used by a user becomes various. Also, a predetermined function that could not be performed by a current device at all may be performed by the current device through a device having the predetermined function in a heterogeneous network through a relay device. Since a user interface may be flexibly changed according to a function sharing status between devices, convenience of a user is guaranteed. Also, since devices in a heterogeneous network can be connected to each other, the same result when a network method is changed may be obtained.

The embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

While this invention has been particularly shown and described with reference to embodiments thereof, it will be understood by those skilled in the art that various changes in form and details may be made therein without departing from the spirit and scope of the invention as defined by the appended claims. The embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method comprising:
   establishing, at a second device, a connection to a first device through an external network;
   detecting, through the first device, at least one device connected to the first device through a Bluetooth network which uses a different protocol from the external network, wherein the at least one device is not capable of communicating with the external network to which the first device and the second device are connected;
   selecting, at the second device, from among the detected at least one device, a third device connected to the first device through the Bluetooth network and not capable of communicating with the external network to which the first device and the second device are connected;
   selecting, at the second device, a function of the third device; and
   transmitting, at the second device, a request to the third device through the first device, wherein the request requests that the third device perform the selected function of the third device,
   wherein the second device, which is not capable of directly connecting to the third device through the external network or the Bluetooth network, communicates with the third device through the first device after the second device connects to the first device, and
   wherein the selected function, which is not performable by the second device, is performable after the second device connects to the first device.

2. The method of claim 1, further comprising:
   receiving, at the second device, information about a function performance status of the third device from the first device; and
   displaying, at the second device, the function performance status of the third device.

3. The method of claim 1, wherein the selected function is a predetermined function.

4. The method of claim 1, wherein the second device recommends the selection of the third device.

5. The method of claim 1, wherein the third device is interworked with the second device through the first device.

6. The method of claim 1, wherein the second device is wirelessly connected to the first device, the at least one device is wi relessly connected to the first device, and the external network complies with a wireless fidelity (Wi-Fi) method.

7. The method of claim 1, the first device is a relay device.

8. The method of claim 1, further comprising:
   obtaining, at the second device, information about performable functions of the at least one device.

9. A method comprising:
   establishing, at a third device, a connection with a first device through a Bluetooth network, wherein the third device is detected, through the first device, at a second device connected to the first device through an external network which uses a different protocol from the Bluetooth network, wherein the third device is not capable of communicating with the external network to which the first device and the second device are connected;
   receiving, at the third device, a request from the second device through the first device, wherein the request requests that the third device perform a function of the third device; and
   performing, at the third device, the function of the third device in response to the request from the second device,
   wherein the second device, which is not capable of directly connecting to the third device through the external network or the Bluetooth network, communicates with the third device through the first device after the second device connects to the first device, and
   wherein the selected function, which is not performable by the second device, is performable after the second device connects to the first device.

10. A method comprising:
    establishing, at a first device, a connection with a second device through an external network and a connection with at least one device through a Bluetooth network which uses a different protocol from the external network, wherein the at least one device is not capable of communicating with the external network to which the first device and the second device are connected; and
    relaying, at the first device, a request from the second device to a third device which is connected to the first device through the Bluetooth network, is not capable of communicating with the external network to which the first device and the second device are connected, and is selected from among the at least one device by the second device, wherein the request requests that the third device perform a function of the third device,
    wherein the second device, which is not capable of directly connecting to the third device through the external network or the Bluetooth network, communicates with the third device through the first device after the second device connects to the first device, and wherein the selected function, which is not performable by the second device, is performable after the second device connects to the first device.

11. A non-transitory computer-readable medium comprising instructions which, when a computer program is executed by an electronic device, cause the electronic device to carry out the method of claim 1.

12. A non-transitory computer-readable medium comprising instructions which, when a computer program is executed by an electronic device, cause the electronic device to carry out the method of claim 1.

13. A non-transitory computer-readable medium comprising instructions which, when a computer program is executed by an electronic device, cause the electronic device to carry out the method of claim 10.

14. A second device comprising:
at least one processor configured to execute instructions to:
establish, at the second device, a connection to a first device through an external network;
detect through the first device, at least one device connected to the first device through a Bluetooth network which uses a different protocol from the external network, wherein the at least one device is not capable of communicating with the external network to which the first device and the second device are connected;
select, at the second device, from among the at least one device, a third device connected to the first device through the Bluetooth network and not capable of communicating with the external network to which the first device and the second device are connected;
select, at the second device, a function of the third device; and
transmit, at the second device, a request to the third device through the first device, wherein the request requests that the third device perform the function of the third device,
wherein the second device, which is not capable of directly connecting to the third device through the external network or the Bluetooth network, communicates with the third device through the first device after the second device connects to the first device, and
wherein the selected function, which is not performable by the second device, is performable after the second device connects to the first device.

15. The second device of claim 14, further comprising:
at least one memory storing the instructions.

16. A third device comprising:
at least one processor configured to execute instructions to:
establish, at the third device, a connection with a first device through a Bluetooth network, wherein the third device is detected, through the first device, at a second device connected to the first device through an external network which uses a different protocol from the Bluetooth network, wherein the third device is not capable of communicating with the external network to which the first device and the second device are connected;
receive, at the third device, a request from the second device through the first device, wherein the request requests that the third device perform a function of the third device; and
perform, at the third device, the function of the third device in response to the request from the second device,
wherein the second device, which is not capable of directly connecting to the third device through the external network or the Bluetooth network, communicates with the third device through the first device after the second device connects to the first device, and
wherein the selected function, which is not performable by the second device, is performable after the second device connects to the first device.

17. The third device of claim 16, further comprising:
at least one memory storing the instructions.

18. A first device comprising:
at least one processor configured to execute instructions to:
establish, at the first device, a connection with a second device through an external network and a connection with at least one device through a Bluetooth network which uses a different protocol from the external network, wherein the at least one device is not capable of communicating with the external network to which the first device and the second device are connected; and
relay, at the first device, a request from the second device to a third device which is connected to the first device through the Bluetooth network, is not capable of communicating with the external network to which the first device and the second device are connected, and is selected from among the at least one device by the second device, wherein the request requests that the third device perform a function of the third device,
wherein the second device, which is not capable of directly connecting to the third device through the external network or the Bluetooth network, communicates with the third device through the first device after the second device connects to the first device, and
wherein the selected function, which is not performable by the second device, is performable after the second device connects to the first device.

19. The first device of claim 18, further comprising:
at least one memory storing the instructions.

* * * * *